(12) United States Patent
Kaitha

(10) Patent No.: US 12,217,046 B2
(45) Date of Patent: Feb. 4, 2025

(54) DEPLOYMENT OF NEW VERSIONS OF EVENT CONSUMERS IN AN EVENT-DRIVEN SYSTEM

(71) Applicant: Capital One Services, LLC, McLean, VA (US)

(72) Inventor: Sunil Kaitha, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/317,981

(22) Filed: May 16, 2023

(65) Prior Publication Data
US 2023/0281003 A1    Sep. 7, 2023

Related U.S. Application Data

(63) Continuation of application No. 17/452,810, filed on Oct. 29, 2021, now Pat. No. 11,693,647.

(51) Int. Cl.
*G06F 9/445* (2018.01)
*G06F 8/65* (2018.01)
*G06F 9/54* (2006.01)

(52) U.S. Cl.
CPC .............. *G06F 8/65* (2013.01); *G06F 9/542* (2013.01)

(58) Field of Classification Search
CPC ... G06F 8/65; G06F 9/542; G06F 8/71; G06F 8/60; G06F 11/3616; G06F 2201/865; G06F 8/70

USPC .......................................................... 717/169
See application file for complete search history.

(56) References Cited

U.S. PATENT DOCUMENTS

| 10,775,976 | B1 | 9/2020 | Abdul-Jawad et al. |
| 2002/0129110 | A1* | 9/2002 | Liu .................. G06F 9/542 |
| | | | 709/206 |
| 2012/0036245 | A1* | 2/2012 | Dare .................. H04L 65/1063 |
| | | | 709/223 |
| 2022/0083403 | A1* | 3/2022 | Ferraro .................. G06F 9/546 |
| 2023/0140409 | A1 | 5/2023 | Kaitha |

* cited by examiner

*Primary Examiner* — Chuck O Kendall
(74) *Attorney, Agent, or Firm* — Harrity & Harrity, LLP

(57) ABSTRACT

In some implementations, a system may receive, in a state event store, a deployment state event notification based on deployment of a new event consumer in the system. An old event consumer of the system may retrieve the deployment state event notification from the state event store. The system may deactivate an old event consumer based on retrieving the deployment state event notification, wherein the old event consumer refrains from processing topic event notifications after deactivation and continues to monitor the state event store for state event notifications. The old event consumer may publish a deactivation state event notification to the state event store based on deactivating the old event consumer. The new event consumer may retrieve the deactivation state event notification from the state event store. The system may activate the new event consumer based on retrieving the deactivation state event notification.

20 Claims, 8 Drawing Sheets

DEPLOYMENT OF NEW VERSIONS OF EVENT CONSUMERS IN AN EVENT-DRIVEN SYSTEM

RELATED APPLICATION

This application is a continuation of U.S. patent application Ser. No. 17/452,810, filed Oct. 29, 2021, which is incorporated herein by reference in its entirety.

BACKGROUND

In an event-driven system, an event notification may be triggered based on occurrence of an event, which is a change in state of information relevant to the event-driven system. The event notification may be produced, published, propagated, detected, and/or consumed in connection with the event-driven system.

SUMMARY

Some implementations described herein relate to an event-driven system for deployment of a new version of an event consumer. The event-driven system may include a topic event store configured to store multiple topic event notifications, a state event store configured to store one or more state event notifications, a group of old event consumers, and one or more processors. The group of old event consumers may be configured to process one or more topic event notifications of the multiple topic event notifications stored in the topic event store. The group of old event consumers may be configured to activate or deactivate processing of topic event notifications of the multiple topic event notifications based on a state event notification of the one or more state event notifications. The one or more processors may configured to publish a deployment state event notification to the state event store based on deployment of a new event consumer that is a newer version than the group of old event consumers. The deployment state event notification may cause an old event consumer, of the group of old event consumers, to deactivate the old event consumer, refrain from processing topic event notifications of the multiple topic event notification based on deactivating the old event consumer, and publish a deactivation state event notification to the state event store based on deactivating the old event consumer. The deactivation state event notification may cause the new event consumer to activate the new event consumer begin processing topic event notifications of the multiple topic event notifications based on activating the new event consumer.

Some implementations described herein relate to a method for deployment of a new version of an event consumer in an event-driven system. The method may include receiving, in a state event store of the event-driven system, a deployment state event notification based on deployment of a new event consumer in the event-driven system, wherein the new event consumer is a newer version of an old event consumer previously deployed in the event-driven system. The method may include retrieving, by the old event consumer, the deployment state event notification from the state event store. The method may include deactivating the old event consumer based on retrieving the deployment state event notification, wherein the old event consumer refrains from processing topic event notifications, stored in a topic event store of the event-driven system, after deactivation and continues to monitor the state event store for state event notifications. The method may include publishing, by the old event consumer, a deactivation state event notification to the state event store based on deactivating the old event consumer. The method may include retrieving, by the new event consumer, the deactivation state event notification from the state event store. The method may include activating the new event consumer based on retrieving the deactivation state event notification, wherein the new event consumer begins processing topic event notifications, stored in the topic event store, after activation.

Some implementations described herein relate to an event-driven system for deploying a new event consumer. The event-driven system may include means for receiving a deployment state event notification based on deployment of the new event consumer in the event-driven system, wherein the new event consumer is a newer version of an old event consumer deployed in the event-driven system. The event-driven system may include means for deactivating the old event consumer based on the deployment state event notification, wherein the old event consumer refrains from processing topic event notifications, stored in a topic event store of the event-driven system, after deactivation, and wherein the old event consumer continues to monitor for state event notifications, stored in a state event store, after deactivation. The event-driven system may include means for publishing a deactivation state event notification based on deactivating the old event consumer. The event-driven system may include means for activating the new event consumer based on the deactivation state event notification, wherein the new event consumer begins processing topic event notifications, stored in the topic event store, after activation.

Implementations described herein are applicable to a variety of deployment types. For example, implementations described herein are applicable to blue-green deployments, where only one of the old event consumer or the new event consumer is active at any given time, and to canary deployments, where both the old event consumer and the new event consumer are permitted to be active at any given time.

DETAILED DESCRIPTION

Figure 1A:
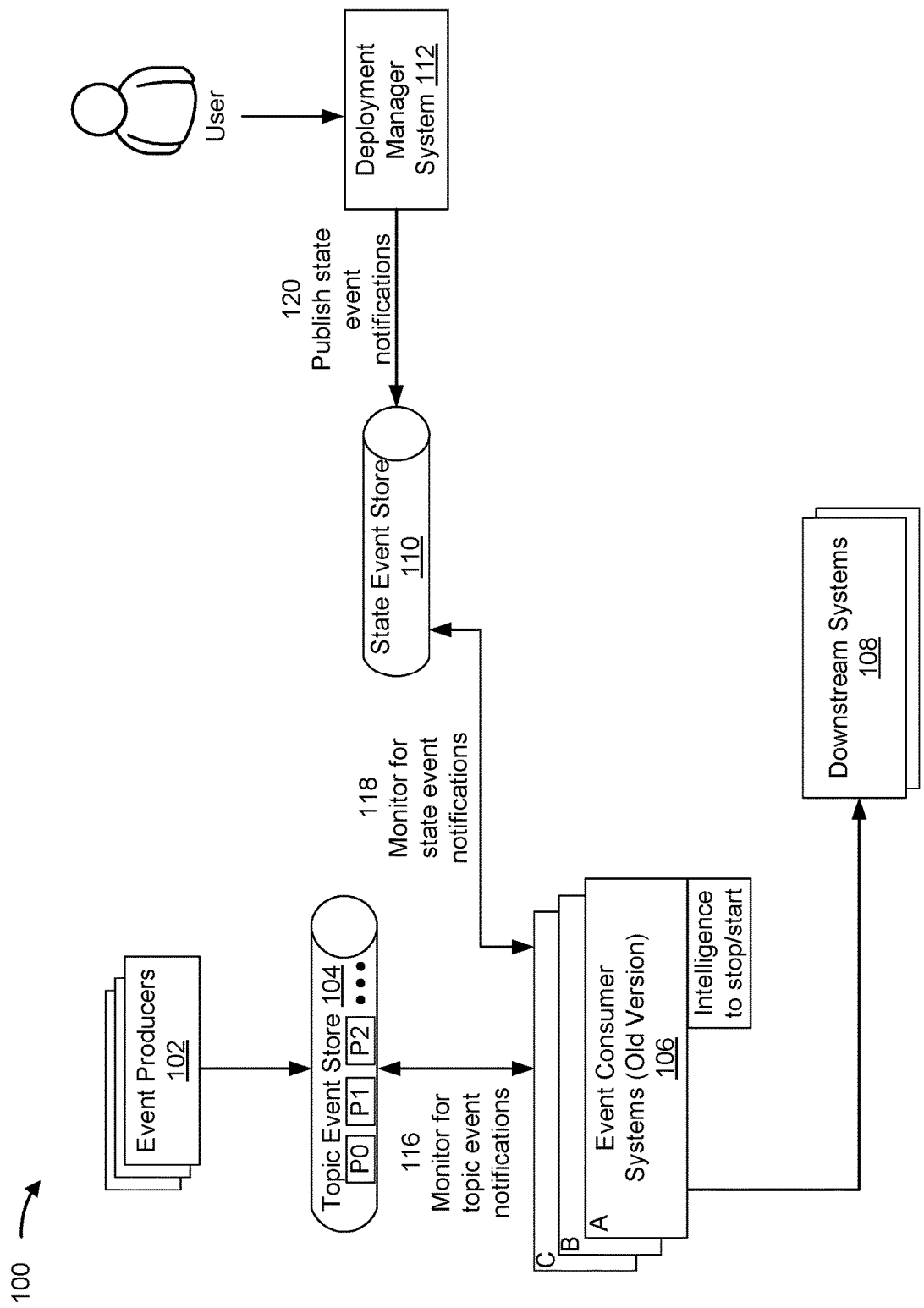
FIGS. 1A-1D are diagrams of an example system relating to deployment of new versions of event consumers in an event-driven system.

The following detailed description of example implementations refers to the accompanying drawings. The same reference numbers in different drawings may identify the same or similar elements.

In an event-driven system, an event notification may be triggered by an event producer based on occurrence of an event, which is a change in state of information relevant to the event-driven system. The event-driven system may process an event notification, associated with an event, based on the event notification being triggered and stored in an event store (e.g., a data structure that stores event notifications). Event notifications may be processed by event consumers and propagated to downstream systems (e.g., for additional processing). In an event-driven system, event notifications are continuously processed, or "streamed." For example, when an event consumer finishes processing an event notification, the event consumer retrieves another event notification from the event store for processing, and so on.

The continuous processing of event notifications in an event-driven system creates challenges in connection with deploying updates to event consumers (e.g., deploying updated software code of an event consumer). In some cases, a "snapshot" of the event store may be taken, where all event notifications stored in the event store at a particular time are captured and stored in a separate database that does not operate in an event-driven manner (e.g., a database where event notifications are not pulled or are not continuously pulled by an event consumer and may instead be pushed to the event consumer). After the database is set up, a new version of an event consumer (sometimes called a "new event consumer") may be deployed, and event notifications stored in the separate database may be pushed to the new event consumer for processing. During this time, an old version of the event consumer (sometimes called an "old event consumer") may be deactivated and may refrain from processing event notifications from the event store. If deployment of the new event consumer is successful, the event store may be updated to remove event notifications that were processed by the new event consumer from the separate database, and the new event consumer may then be transitioned to the event-driven system to pull event notifications from the event store. However, this creates complexity, can lead to delays in event notification processing associated with setting up the database and/or removing event notifications from the event store, and requires duplication of event notifications in multiple data structures, which increases memory usage. Furthermore, this may result in unprocessed event notifications if the database is set up incorrectly and/or event notifications are improperly removed from the event store.

In some other cases, an old event consumer may be deactivated and may stop processing event notifications from the event store prior to a new event consumer being deployed directly in the event-driven system and starting to process event notifications from the event store. However, this can lead to downtime and delays in event notification processing due to delays associated with deploying the new event consumer, especially if there are problems with the deployment. In still other cases, to minimize downtime and delays associated with event notification processing, a new event consumer may be deployed while an old event consumer is still active and processing event notifications. However, when the new event consumer is deployed in an event-driven system, the new event consumer may immediately being retrieving and processing event notifications from the event store due to the design of event-driven systems. This may lead to duplicate processing of event notifications by both the old event consumer and the new event consumer until the old event consumer can be deactivated. This duplicate processing wastes computing resources and can lead to downstream errors and issues.

Some techniques described herein enable coordination between a new version of an event consumer (e.g., a newly deployed event consumer) and an old version of the event consumer (e.g., to be replaced by the newly deployed event consumer) to reduce or eliminate downtime while reducing or avoiding duplicate processing of event notifications. For example, some techniques described herein enable event consumers to retrieve event notifications from both a topic event store (e.g., for processing of event notifications to be published to a downstream system) and from a state event store that stores state event notifications that impact a manner in which event notifications are processed in the event-driven system (e.g., by a new event consumer or by an old event consumer). As compared to techniques described above, techniques described in more detail below reduce or eliminate downtime, reduce or eliminate duplicate event notification processing, conserve memory resources, conserve processing resources, and result in fewer errors.

FIGS. 1A-1D are diagrams of an example system 100 associated with deployment of new versions of event consumers in an event-driven system. As shown in FIGS. 1A-1D, example system 100 includes one or more event producers 102, a topic event store 104, one or more old event consumers 106 (shown as "event consumer systems (old version)"), one or more downstream systems 108, a state event store 110, a deployment manager system 112, and one or more new event consumers 114 (shown as "event consumer systems (new version)"). These devices are described in more detail below in connection with FIG. 3 and FIG. 4.

An event producer 102 may transmit topic event notifications to the topic event store 104 for storage by the topic event store 104 and processing by an event consumer (e.g., an old event consumer 106 or a new event consumer 114). When an event producer 102 detects a topic event, the event producer 102 may transmit a topic event notification, that represents the topic event (and that may include information about the topic event), to the topic event store 104. The topic event may include a change in state of information relevant to the event-driven system, such as from an internal or an external input. A topic event can be generated based on user input (e.g., a mouse click or a keystroke), based on an external source (e.g., a output from a sensor), or from an internal source (e.g., from another system that is upstream from the system 100).

An event notification is a message sent by one part of the system 100 to notify another part of the system 100 about the occurrence of the event. For example, a topic event notification may be passed between different parts of the system 100 based on occurrence of a topic event. Similarly, a state event notification may be passed between different parts of the system 100 based on occurrence of a state event. A topic event is an event that causes an event consumer to process a topic event notification, generated based on the topic event, and to transmit an output to a downstream system 108 (e.g., external from the event consumers and event stores included in the system 100). A state event is an event that impacts a manner in which topic event notifications are processed by the system 100. For example, a state event and a corresponding state event notification may dictate whether topic event notifications are to be processed by an old event consumer 106 or a new event consumer 114. Additionally, or alternatively, a state event notification may control whether an event consumer is to be activated (e.g., to begin processing topic event notifications from the topic event store 104) or is to be deactivated (e.g., to stop processing or refrain from processing topic event notifications from the topic event store 104). Although the term "event notification" is used herein to refer to information that is stored and passed between various components based on the occurrence of an event, sometimes an event notification is called an "event," an "event message," or "event data."

The topic event store 104 may store event notifications for topic events associated with a particular topic (e.g., a particular type of topic event). In some implementations, different topic event stores 104 may store event notifications for different topics. For example, an event producer 102 may detect only particular types of events and may publish event notifications to the topic event store 104 based on detecting that particular type of event. Alternatively, an event producer 102 may detect multiple types of events and may transmit corresponding event notifications to an event filter (not shown). The event filter may determine a type of event associated with the event notification (e.g., a topic) and may transmit an event notification to the appropriate topic event store 104 based on the type of event. An event consumer (e.g., an old event consumer 106 or a new event consumer 114) may retrieve events from a topic event store 104 that stores event notifications for a topic to be handled by the event consumer. Different event consumers may process event notifications associated with different topics, and thus different event consumers may pull events from different topic event stores 104. In some implementations, a particular event consumer may pull event notifications from only a single topic event store 104 (or from multiple topic event stores 104 that stores the same types of event notifications).

An event consumer may be configured to process event notifications stored in the topic event store 104. As described above, an event consumer may be configured to process event notifications associated with a particular event type. For example, an event consumer may include software code and hardware on which the software code executes. The software code may include instructions for processing an event notification associated with a particular event type. The software code may be updated from an old version, executed by the old event consumer 106, to a new version executed by the new event consumer 114, as described in more detail below. After an event consumer processes an event notification, the event consumer may transmit an output (e.g., a result of the processing) to one or more downstream systems 108. A downstream system 108 may include another system similar to the system 100, may include a data structure for storing the output or information determined based on the output, may include an output device for outputting information based on the output, or the like. Additionally, or alternatively, after an event consumer processes an event notification, the event consumer may transmit a message to the topic event store 104 to update metadata (e.g., a flag and/or a timestamp) associated with the event notification (e.g., to indicate that the event notification has been processed).

As shown in FIG. 1A, in some implementations, the topic event store 104 may be divided into multiple partitions, shown as P0, P1, P2, and so on. Each partition may store a subset of the event notifications stored in the topic event store 104. In some implementations, the subsets of event notifications stored by different partitions are mutually exclusive, with each event notification in the topic event store 104 being stored in only a single partition (e.g., none of the event notifications are stored in more than one partition). In some implementations (e.g., to utilize parallel processing), multiple event consumers (e.g., a group of event consumers, shown as old event consumers A, B, and C) may process event notifications from the same topic event store 104. In this case, each event consumer may retrieve event notifications from a different partition or a different set of partitions of the topic event store 104. In the example system 100, event consumer A may retrieve events from partition P0, event consumer B may retrieve events from partition P1, event consumer C may retrieve events from partition P2, and so on.

The state event store 110 may store one or more state event notifications. As described above, a state event notification may correspond to a state event that impacts a manner in which topic event notifications are processed by the system 100. Unlike a topic event notification, which results in an output to a downstream system 108 after processing, a state event notification may not result in an output to a downstream system 108 and may be used internally for managing processing of event notifications. In some implementations, all event consumers in the system 100 may retrieve state event notifications from the same state event store 110. Thus, an event consumer may monitor for and/or retrieve event notifications from both a topic event store 104, as shown by reference number 116, and a state event store 110, as shown by reference number 118.

The deployment manager system 112 may be used to trigger deployment of a new event consumer 114 to replace an old event consumer 106 (e.g., due to a software update, a change in software code, or the like). For example, a user may interact with the deployment manager system 112 to identify the new event consumer 114 and trigger the deployment to the system 100 (e.g., via interaction with a user interface). Additionally, or alternatively, the deployment manager system 112 may be used to manage deployment of a new event consumer 114, as described in more detail below. As shown by reference number 120, the deployment manager system 112 may publish one or more state event notifications to the state event store 110, as described in more detail below.

Figure 1B:
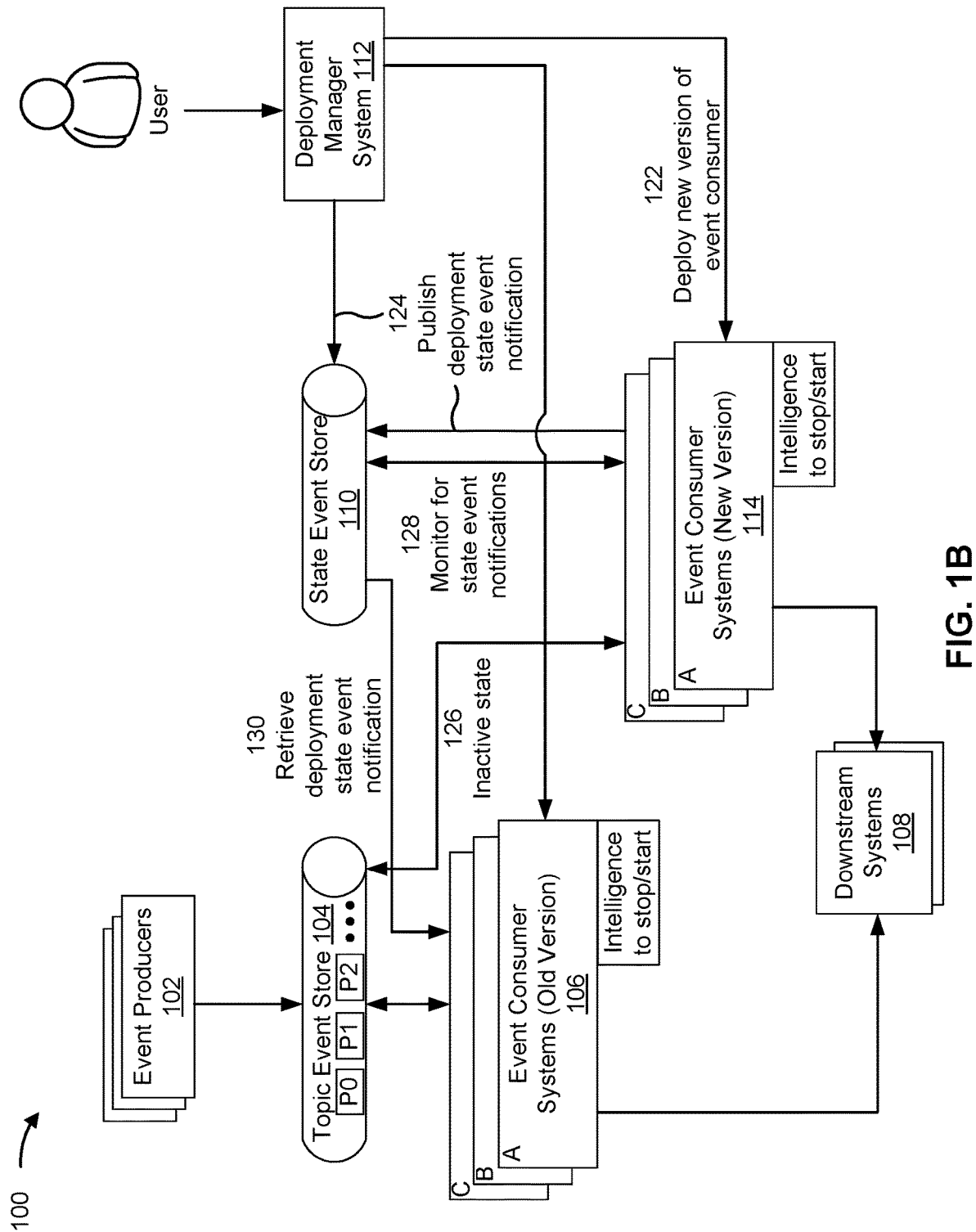

As shown in FIG. 1B, and by reference number 122, the deployment manager system 112 may deploy a new version of an event consumer, referred to as a new event consumer 114, and shown as an event consumer system (new version). The new event consumer 114 may include software code that is a different (e.g., a new or updated) version than the old event consumer 106. The old event consumer 106 may be a previously deployed event consumer (e.g., deployed prior to deployment of the new event consumer 114). For example, the old event consumer 106 and the new event consumer 114 may both include software code to execute the type of event notification stored in the topic event store 104, but the software code of the different event consumers may process those event notifications differently (e.g., in a more efficient manner, using different software logic, or the like). The deployment manager system 112 may deploy the new event consumer 114 by installing and/or storing the software code in hardware (e.g., memory) of the system 100. In some implementations, the deployment manager system 112 may deploy a group of new event consumers 114, shown as new event consumers A, B, and C.

As shown by reference number 124, the deployment manager system 112 and/or the new event consumer 114 may publish (e.g., transmit for storage) a deployment state event notification to the state event store 110. In some implementations, the deployment manager system 112 may publish the deployment state event notification to the state event store 110, such as immediately before or immediately after deploying the new event consumer 114. Alternatively, the new event consumer 114 may publish the deployment state event notification to the state event store 110, such as immediately after the new event consumer 114 is deployed.

As shown by reference number 126, the new event consumer 114 may initially be in an inactive state (e.g., may be deactivated) and may refrain from retrieving and/or processing any topic event notifications from the topic event store 104 after deployment and until retrieving a deactivation state event notification associated with the old event consumer 106, as described in more detail below. In this way, duplicate event notification processing may be avoided. However, as shown by reference number 128, upon deployment, the new event consumer 114 may monitor the state event store 110 for state events so that the new event consumer 114 can retrieve the deactivation state event notification after the deactivation state event notification is published to the state event store 110 by the old event consumer 106, as described in more detail below. Thus, a new event consumer 114, upon deployment and prior to activation, may obtain (e.g., retrieve) one or more event notifications from only the state event store (e.g., may retrieve state event notifications) and not the topic event store (e.g., may refrain from retrieving topic event notifications).

As shown by reference number 130, the old event consumer 106 may retrieve the deployment state event notification from the state event store 110 after the deployment manager system 112 and/or the new event consumer 114 publishes the deployment state event notification to the state event store 110. The deployment state event notification may indicate that a new event consumer 114 has been deployed. In some implementations, the deployment state event notification may include an identifier (sometimes called an application identifier or an event consumer identifier) associated with the old event consumer 106 and/or the new event consumer 114. For example, different application identifiers may identify or be associated with different event consumers (e.g., that process different types of topic event notifications). If an old event consumer 106 retrieves a deployment state event notification that includes an application identifier that matches a stored application identifier of the old event consumer 106 (e.g., stored in memory associated with the old event consumer 106), then this may indicate that the old event consumer 106 is to be deactivated due to deployment of a new version of the old event consumer 106.

If an event consumer retrieves a deployment state event notification that includes an application identifier that does not match a stored application identifier of the event consumer, then this may indicate that a new event consumer is to replace a different event consumer than the event consumer (e.g., is to replace an event consumer that processes a different type of event notification than the event consumer), and the event consumer may continue to process topic events. In this way, if the system 100 includes multiple types of event consumers that process different topic events, then each event consumer may be capable of determining whether a newly deployed event consumer is a replacement for that event consumer.

Additionally, or alternatively, the deployment state event notification may include a version identifier that indicates a version of the new event consumer 114. In this case, if an old event consumer 106 retrieves a deployment state event notification that includes a version identifier that indicates a newer version than a stored version identifier of the old event consumer 106 (e.g., stored in memory associated with the old event consumer 106), then this may indicate that the old event consumer 106 is to be deactivated due to deployment of a new version of the old event consumer 106 (e.g., if the application identifier matches, in an implementation where the deployment state event notification includes both an application identifier and a version identifier). If an event consumer retrieves a deployment state event notification that includes a version identifier that indicates a same version as, or an older version than, a stored version identifier of the event consumer, then this may indicate that a newly deployed event consumer is not to replace the event consumer, and the event consumer may continue to process topic events. In this way, the system 100 may automatically and correctly handle deployment of various versions of an event consumer.

In some implementations, the deployment state event notification may include a state type identifier that indicates that the deployment state event notification is a deployment state event notification and not another type of state event notification (e.g., a deactivation state event notification). For example, the state type identifier may include a single bit, where a first value of the bit (e.g., 0) indicates that the state event notification is a deployment state event notification, and a second value of the bit (e.g., 1) indicates that the state event notification is a deactivation state event notification, described in more detail below. Alternatively, a state event notification may indicate a state event notification type (e.g., the deployment state event notification or the deactivation state event notification) without an explicit indication, such as based on one or more fields included in the state event notification. For example, presence of an application identifier field and a version identifier field may indicate a deployment state event notification, whereas presence of only an application identifier field (without a version identifier field) may indicate a deactivation state event notification. Additionally, or alternatively, a state event notification may indicate a state event notification type (e.g., the deployment state event notification or the deactivation state event notification) based on one or more values included in one or more fields that are included in the state event notification. For example, if an event consumer retrieves a state event notification with a version identifier that identifies a newer version than a version of the event consumer, then this may indicate that the state event notification is a deployment state event notification. If an event consumer retrieves a state event notification with a version identifier that identifies an older version than a version of the event consumer, then this may indicate that the state event notification is a deactivation state event notification. The event consumer may perform one or more actions (described elsewhere herein) based on whether the state event notification is a deployment state event notification or a deactivation state event notification.

Figure 1C:
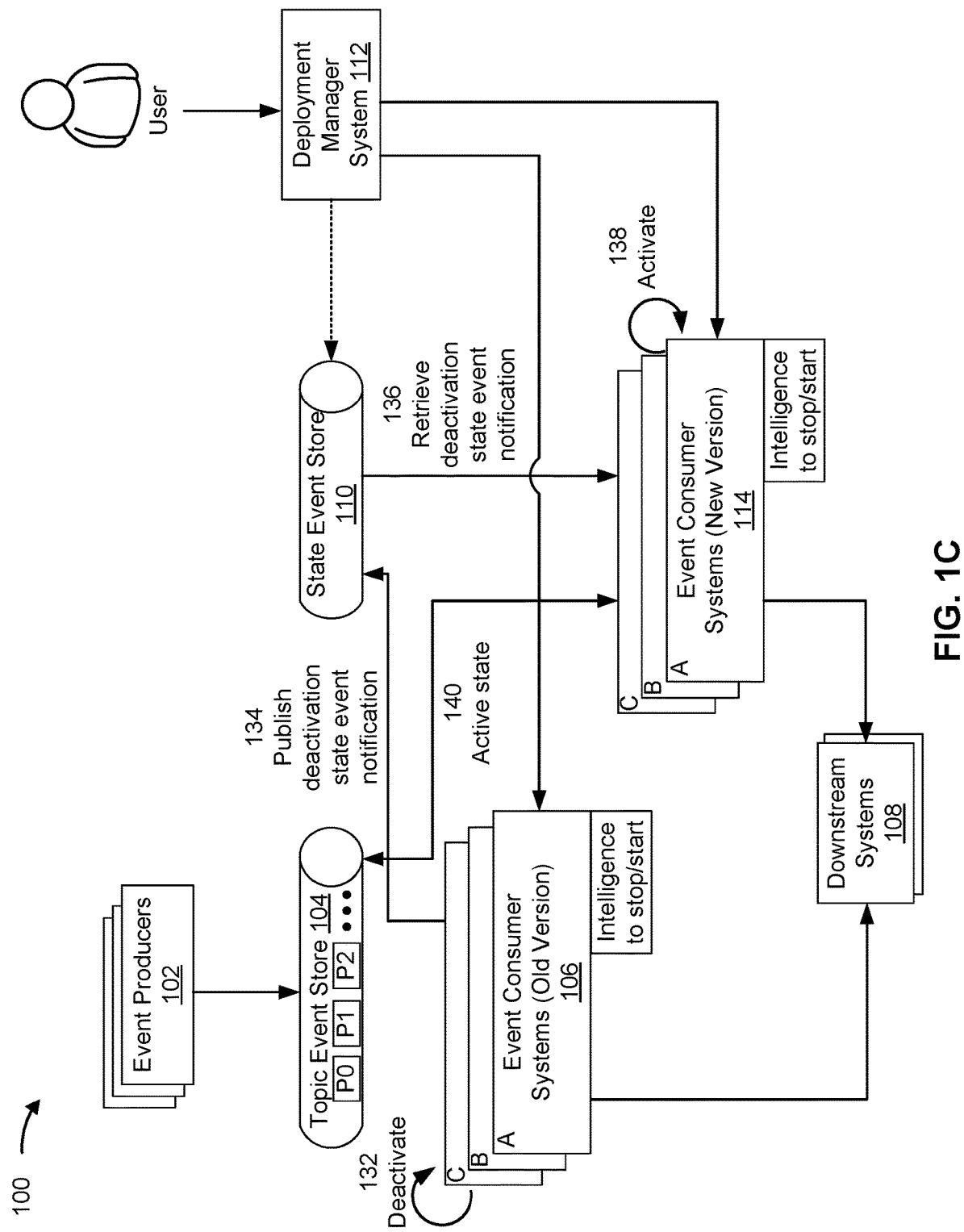

As shown in FIG. 1C, and by reference number 132, the old event consumer 106 may be deactivated (e.g., may deactivate itself) based on retrieving the deployment state event notification (e.g., based on one or more conditions associated with the application identifier and/or the version identifier being satisfied, as described above). When the old event consumer 106 is deactivated, the old event consumer 106 may refrain from retrieving and/or processing topic event notifications from the topic event store 104. However, the old event consumer 106 may continue to retrieve and/or process state event notifications from the state event store 110 when the old event consumer 106 is deactivated (e.g., to determine whether the old event consumer 106 should be reactivated or shut down, as described in more detail below).

In some implementations, if the old event consumer 106 is processing a topic event notification when the old event consumer 106 receives the deployment state event notification, then the old event consumer 106 may finish processing the topic event notification. After the old event consumer 106 finishes processing the topic event notification (and updating the topic event store 104 to indicate that the topic event notification has been processed), the old event consumer may refrain from processing any additional topic event notifications from the topic event store 104 and may publish a deactivation state event notification to the state event store 110, as described below. In this way, duplicate processing of event notifications can be avoided.

In some implementations, such as for a blue-green deployment where only one of the old version or the new version of an event consumer is active at any given time, the deployment state event notification may cause all of the old event consumers 106 (e.g., old event consumers A, B, and C) to deactivate and refrain from processing additional topic event notifications from the topic event store 104. In this case, each of the old event consumers 106 may have the same application identifier and may be deactivated upon receiving a deployment state event notification that includes a matching application identifier. Alternatively, each of the old event consumers 106 may have a different, unique application identifier. In this case, the deployment state event notification may include all of the unique application identifiers (e.g., for all of the old event consumers 106) to deactivate all of the old event consumers 106. Alternatively, the deployment manager system 112 may publish multiple deployment state event notifications, each with a different single application identifier that matches one of the unique application identifiers of the old event consumers 106. For example, the deployment manager system 112 may publish three deployment state event notifications, each of which causes deactivation of a different one of the event consumers A, B, or C. As another example, each new event consumer 114 may publish a deployment state event notification that includes an application identifier corresponding to one of the event consumers A, B, or C. To deactivate all of the old event consumers A, B, and C (e.g., for the blue-green deployment), new event consumer A may publish a first deployment state event notification with a first application identifier corresponding to old event consumer A, new event consumer B may publish a second deployment state event notification with a second application identifier corresponding to old event consumer B, and new event consumer C may publish a third deployment state event notification with a third application identifier corresponding to old event consumer C.

In some implementations, such as for a canary deployment where both the old version and the new version of the event consumer are permitted to be active at any given time, each old event consumer 106 may be configured to process topic event notifications from a different partition or subset of partitions of the topic event store 104. The partitions may be distributed in a mutually exclusive manner across the old event consumers 106 such that each partition is assigned to a single old event consumer 106 (e.g., topic event notifications cannot be retrieved from a particular partition by more than one old event consumer 106). In this example, a particular old event consumer 106 is permitted to process topic event notifications from more than one partition, but multiple old event consumers 106 are not permitted to process topic event notifications from the same partition.

To implement a canary deployment, a new event consumer 114 may receive information (e.g., from the deployment manager system 112) and/or may store information (e.g., in code) that indicates a subset of partitions (e.g., one or more partitions) assigned to the new event consumer 114. The deployment manager system 112 and/or the new event consumer 114 may publish a deployment state event notification that includes an application identifier that corresponds to an old event consumer 106 that is assigned to that same subset of partitions. As a result, the old event consumer 106 may stop processing topic event notifications from that subset of partitions, and the new event consumer 114 may begin processing topic event notifications from that subset of partitions (e.g., after receiving a deactivation state event notification published by the old event consumer 106 and including an application identifier corresponding to the new event consumer 114, as described below). However, one or more other old event consumers 106 may continue processing topic event notifications from one or more partitions other than the subset of partitions (e.g., until those one or more other old event consumers 106 receive corresponding deployment state event notifications). In this way, some of the topic event notifications (e.g., included in a first subset of partitions) may be processed by one or more old event consumers 106, and some of the topic event notifications (e.g., included in a second subset of partitions) may be processed by one or more new event consumers 114. Thus, in some implementations, a deployment state event notification may cause a first old event consumer 106 to be deactivated and refrain from processing first topic event notifications (e.g., from a first subset of partitions) while a second old event consumer 106 is active and processing second topic event notifications (e.g., from a second subset of partitions). The new event consumer 114 may begin processing topic event notifications from a partition (e.g., the first subset of partitions) associated with the first old event consumer 106 (e.g., upon receiving a deactivation state event notification, as described below).

In some implementations, such as for a canary deployment, the deployment manager system 112 may determine (e.g., based on user input) a percentage of topic event notifications, of the multiple topic event notifications stored in the topic event store 104, to be processed by one or more new event consumers 114. Based on the percentage, the deployment manager system 112 may identify one or more old event consumers 106 to be deactivated. For example, assume that topic event notifications are evenly distributed across ten partitions, with old event consumer A being assigned to three partitions, old event consumer B being assigned to three partitions, and old event consumer C being assigned to four partitions. In this example, if the deployment manager system 112 determines that 40% of the topic event notifications are to be processed by a new version of the old event consumer 106, then the deployment manager system 112 may assign a new event consumer 114 to the four partitions assigned to old event consumer C, and may publish (or cause the new event consumer 114 to publish) a deployment state event notification to deactivate old event consumer C. As another example, if the deployment manager system 112 determines that 60% of the topic event notifications are to be processed by a new version of the old event consumer 106, then the deployment manager system 112 may assign one or more new event consumers 114 to the six partitions that are collectively assigned to old event consumer A and old event consumer B, and may publish (or cause the new event consumer(s) 114 to publish) one or more deployment state event notifications to deactivate old event consumer A and old event consumer B. In some implementations, the deployment manager system 112 may adjust the percentage over time by deploying new event consumers 114, deactivating one or more old event consumers 106, and/or reassigning new event consumers 114 and/or old event consumers 106 to different partitions.

As shown by reference number 134, the old event consumer 106 may publish a deactivation state event notification to the state event store 110 after retrieving the deployment state event notification and/or after deactivating. The deactivation state event notification may indicate that an event consumer (e.g., the old event consumer 106) has been deactivated. In some implementations, the deactivation state event notification may include an identifier (e.g., an application identifier or an event consumer identifier) associated with the old event consumer 106 and/or the new event consumer 114, in a similar manner as described above. If a new event consumer 114 retrieves a deactivation state event notification that includes an application identifier that matches a stored application identifier of the new event consumer 114 (e.g., stored in memory associated with the new event consumer 114), then this may indicate that the new event consumer 114 is to be activated and begin processing topic events from the topic event store 104 due to deactivation of the old event consumer 106. In this way, duplicate processing can be avoided. In some implementations, the deactivation state event notification may include a version identifier and/or an indication that the deactivation state event notification is a deactivation state event notification (and not a deployment state event notification), as described above.

As shown by reference number 136, the new event consumer 114 may retrieve the deactivation state event notification from the state event store 110. For example, the new event consumer 114 may continuously monitor and/or periodically retrieve state event notifications stored in the state event store 110, even when the new event consumer 114 is deactivated or not yet activated.

As shown by reference number 138, the new event consumer 114 may be activated (e.g., may activate itself) based on retrieving the deactivation state event notification. When the new event consumer 114 is activated, the new event consumer 114 may retrieve (e.g., may begin retrieving) and/or process (e.g., may begin processing) topic event notifications from the topic event store 104. In addition, the new event consumer 114 may continue to retrieve and/or process state event notifications from the state event store 110 when the new event consumer 114 is activated. Thus, the deactivation state event notification, published by the old event consumer 106, may cause the new event consumer 114 to be activated and begin processing topic event notifications from the topic event store 104. In some implementations, the new event consumer 114 may analyze metadata (e.g., a flag and/or a timestamp) associated with stored topic event notifications to identify topic event notifications that have already been processed and/or to identify topic event notifications that have not yet been processed. Based on the metadata, the new event consumer 114 may identify a topic event notification that the new event consumer 114 is to begin processing (e.g., beginning with an earlier unprocessed topic event notification).

In some implementations, the deactivation state event notification may include an application identifier and/or a version identifier, similar to those described in connection with the deployment state event notification. In some implementations, the new event consumer 114 may activate itself based on the application identifier matching a stored application identifier associated with the new event consumer 114 and/or based on the version identifier indicating an older version than a stored version identifier associated with the new event consumer 114.

Thus, as shown by reference number 140, the new event consumer 114 may be in an active state after activation. In the active state, the new event consumer 114 may retrieve and/or process topic event notifications from the topic event store 104 and may monitor the state event store 110 for state events.

Figure 1D:
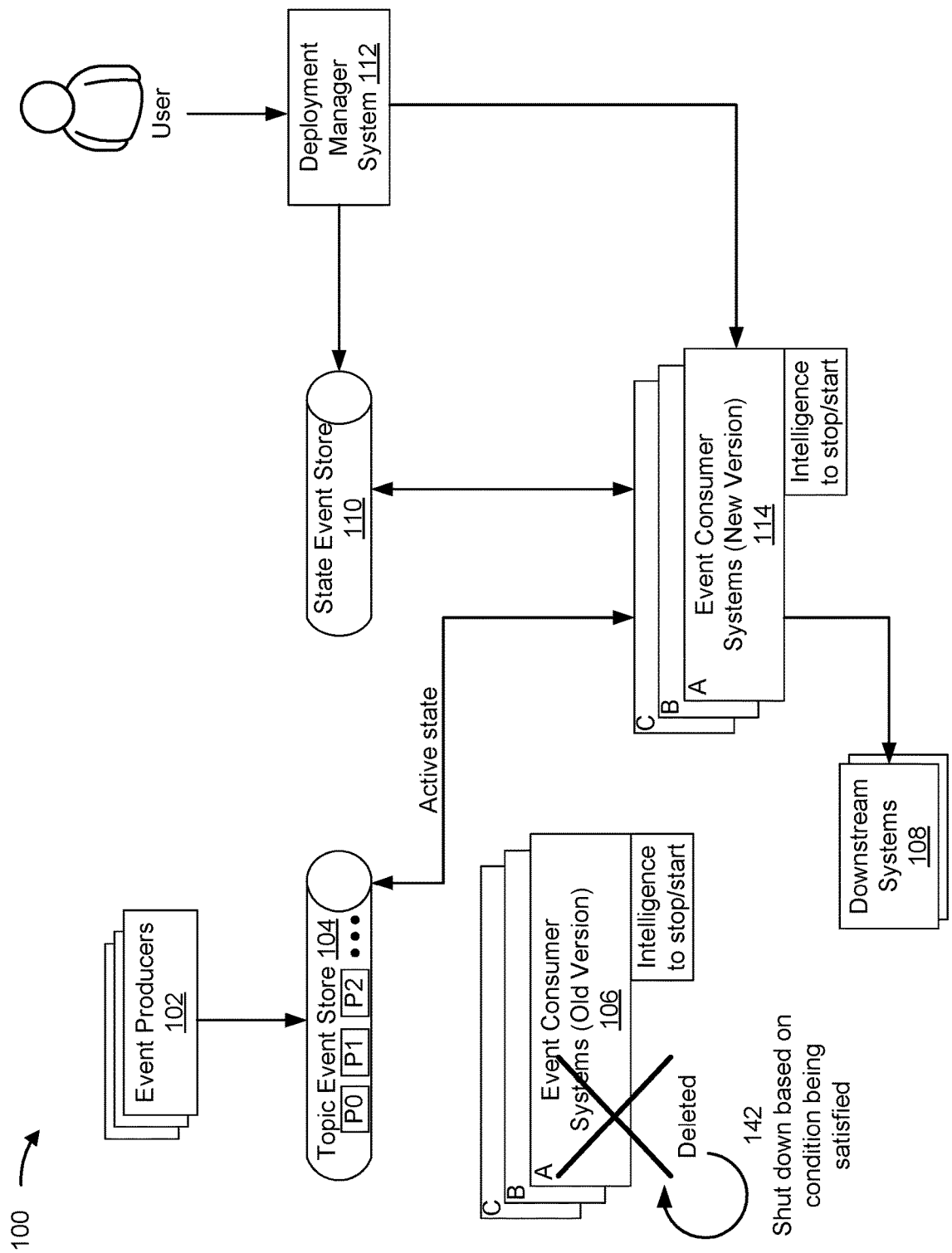

As shown in FIG. 1D, and by reference number 142, the old event consumer 106 may be shut down (e.g., may shut itself down, or may be shut down by the deployment manager system 112 and/or another component of the system 100) after the new event consumer 114 is activated. When the old event consumer 106 is shut down, the old event consumer 106 may refrain from retrieving and/or processing topic event notifications from the topic event store 104 and may also refrain from retrieving and/or processing state event notifications from the state event store 110. In some implementations, the old event consumer 106 may be shut down by uninstalling the old event consumer 106, by deleting software code of the old event consumer 106 from memory, or the like.

In some implementations, the old event consumer 106 may be shut down based on a condition being satisfied, such as a condition associated with processing of topic event notifications by the new event consumer 114 (e.g., corresponding to the old event consumer 106). For example, if the new event consumer 114 successfully processes topic event notifications for a threshold amount of time or successfully processes a threshold quantity of topic event notifications, then the old event consumer may be shut down.

In some implementations, if the new event consumer 114 detects a failure associated with processing topic event notifications after activation of the new event consumer 114, then the new event consumer 114 may publish a failure state event notification to the state event store 110. Alternatively, the new event consumer 114 may notify the deployment manager system 112 of the failure, and the deployment manager system 112 may publish the failure state event notification to the state event store 110. Alternatively, the deployment manager system 112 may detect a failure associated with the new event consumer 114 processing topic event notifications and may publish a failure state event notification to the state event store 110 based on detecting the failure. Furthermore, based on detecting the failure, the new event consumer 114 may be deactivated. For example, the new event consumer 114 may deactivate itself based on detecting the failure or may receive an instruction to deactivate based on the deployment manager system 112 detecting the failure.

The failure state event notification may indicate that the new event consumer 114 has failed in the processing of topic event notifications, may indicate that the new event consumer 114 is to be deactivated, and/or may indicate that the old event consumer 106 is to be reactivated (e.g., after the old event consumer 106 has been deactivated and prior to the old event consumer 106 being shut down). In some implementations, the failure state event notification may include an application identifier, as described above, so that the old event consumer 106 can identify relevant failure state event notifications (e.g., that match a stored application identifier of the old event consumer 106 and cause the old event consumer 106 to be reactivated). In some implementations, the failure state event notification may include a version identifier, as described above. In some implementations, the failure state event notification includes the same contents as the deactivation state event notification described above because the failure state event notification indicates deactivation of the new event consumer 114. Thus, a single bit flag may be used to differentiate between two types of state event notifications: the deployment state event notification and the deactivation state event notification (including the failure state event notification). Alternatively, more than one bit may be used to differentiate between different types of state event notifications (e.g., the deployment state event notification, the deactivation state event notification, and the failure state event notification).

A deactivated (but not yet shut down) old event consumer 106 may retrieve the failure state event notification from the state event store 110 based on monitoring and/or periodically retrieving state events from the state event store 110. Based on retrieving the failure state event notification, the old event consumer 106 may be activated and may resume processing topic event notifications after activation (e.g., from the topic event store 104 generally or from one or more partitions, of the topic event store 104, that are assigned to the old event consumer 106). If an old event consumer 106 retrieves a failure state event notification that includes an application identifier that matches a stored application identifier of the old event consumer 106, then this may indicate that the old event consumer 106 is to be activated and resume processing topic events from the topic event store 104 due to deactivation and/or failure of the new event consumer 114. In this way, duplicate processing can be avoided.

In some cases, a new event consumer 114 may fail to process topic event notifications, but the new event consumer 114 may have communication errors that prevent the new event consumer 114 and/or the deployment manager system 112 from publishing a failure state event notification to the state event store 104. To account for this scenario, the new event consumer 114 and/or the deployment manager system 112 may publish a success state event notification to the state event store 110 after the new event consumer 114 has successfully processed a threshold quantity of topic event notifications and/or has successfully processed topic event notifications for a threshold amount of time (e.g., without experiencing a failure). The success state event notification may include an application identifier, a version identifier, and/or an indication that the success state event notification is a success state event notification (rather than another type of state event notification), in a similar manner as described elsewhere herein. In this case, the old event consumer 106 may be activated (e.g., reactivated) and resume processing topic event notifications based on determining that a threshold amount of time has elapsed without the old event consumer 106 retrieving a success state event notification (e.g., that includes an application identifier corresponding to the old event consumer 106) from the state event store 110. This may reduce delays in event notification processing despite a failure of the new event consumer 114.

When the old event consumer 106 resumes processing of topic event notifications because of a failure to receive a success state event notification, and then the failure associated with the new event consumer 114 is resolved, the new event consumer 114 may begin processing topic event notifications, which could lead to duplicate processing. To prevent this, the old event consumer 106 may publish an activation state event notification to the state event store 110 based on activation of the old event consumer 106 (e.g., after activation of the old event consumer 106 as a result of failing to receive the success state event notification). Then if the failure associated with the new event consumer 114 is resolved, the new event consumer 114 may retrieve the activation state event notification (e.g., with a matching application identifier) from the state event store 104, which indicates that the new event consumer 114 is to be deactivated without processing any topic event notifications. The activation state event notification may include an application identifier, a version identifier, and/or an indication that the activation state event notification is an activation state event notification (rather than another type of state event notification), in a similar manner as described elsewhere herein. If the failure is resolved, the new event consumer 114 and/or the deployment manager system 112 may re-publish a deployment state event notification, as described above in connection with reference number 124, to trigger deactivation of the old event consumer 106 and activation of the new event consumer 114, as described above.

As described above, the old event consumer 106 may be shut down based on a condition being satisfied. In some implementations, the condition may be that a threshold amount of time has elapsed without the old event consumer 106 retrieving a failure state event notification (e.g., that includes an application identifier corresponding to the old event consumer 106) from the state event store 110. Additionally, or alternatively, the condition may be that the old event consumer 106 retrieves a success state event notification (e.g., that includes an application identifier corresponding to the old event consumer 106) from the state event store 110. In this way, processing delays may be reduced by deactivating the old event consumer 106 for some period of time rather than shutting down the old event consumer 106, which allows the old event consumer 106 to be quickly reactivated in case of a failure. Furthermore, after the new event consumer 114 is operating successfully, the old event consumer 106 may be shut down to conserve memory resources of the system 100.

By enabling coordination between a new version of an event consumer (e.g., a newly deployed event consumer) and an old version of the event consumer (e.g., to be replaced by the newly deployed event consumer), techniques described herein reduce or eliminate downtime while also reducing or avoiding duplicate processing of event notifications. These techniques also provide flexibility in selecting a type of deployment to use and are applicable to both blue-green deployments and canary deployments.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
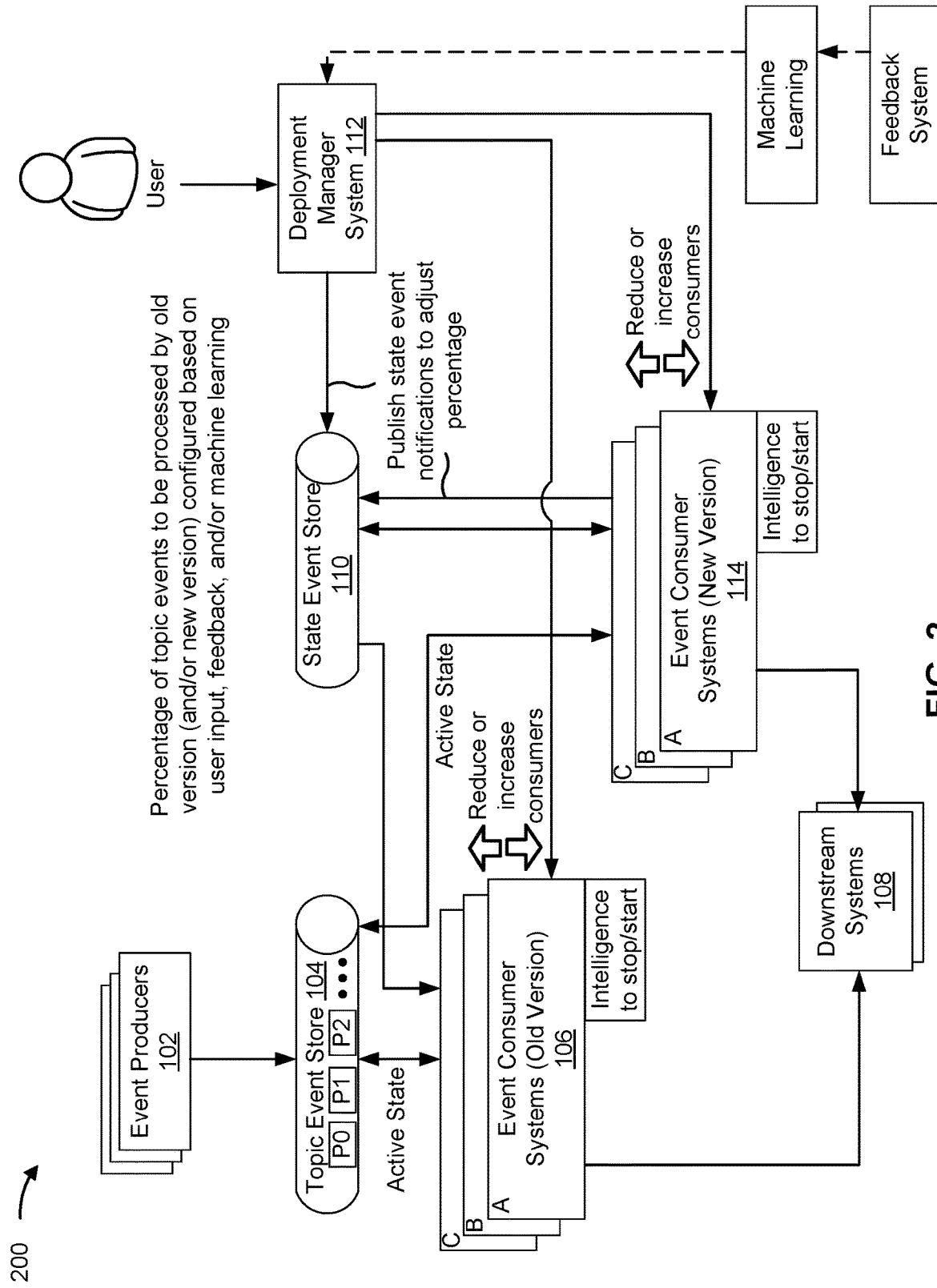
FIG. 2 is a diagram of another example system relating to deployment of new versions of event consumers in an event-driven system.

FIG. 2 is a diagram of an example system 200 relating to deployment of new versions of event consumers in an event-driven system. As shown in FIG. 2, example system 200 may include the same components as example system 100, such as one or more event producers 102, a topic event store 104, one or more old event consumers 106 (shown as "event consumer systems (old version)"), one or more downstream systems 108, a state event store 110, a deployment manager system 112, and one or more new event consumers 114 (shown as "event consumer systems (new version)"). These devices are described in more detail below in connection with FIG. 3 and FIG. 4.

In some implementations, such as for a canary deployment where both the old version and the new version of the event consumer are permitted to be active at any given time, each old event consumer 106 may be configured to process topic event notifications from a different partition or subset of partitions of the topic event store 104, shown as P0, P1, P2, and so on. To implement a canary deployment, a new event consumer 114 may receive information (e.g., from the deployment manager system 112) and/or may store information (e.g., in code) that indicates a subset of partitions (e.g., one or more partitions) assigned to the new event consumer 114. The deployment manager system 112 and/or the new event consumer 114 may publish a deployment state event notification that includes an application identifier that corresponds to an old event consumer 106 that is assigned to that same subset of partitions. As a result, the old event consumer 106 may stop processing topic event notifications from that subset of partitions, and the new event consumer 114 may begin processing topic event notifications from that subset of partitions (e.g., after receiving a deactivation state event notification published by the old event consumer 106 and including an application identifier corresponding to the new event consumer 114, as described below). However, one or more other old event consumers 106 may continue processing topic event notifications from one or more partitions other than the subset of partitions (e.g., until those one or more other old event consumers 106 receive corresponding deployment state event notifications). In this way, some of the topic event notifications (e.g., included in a first subset of partitions) may be processed by one or more old event consumers 106, and some of the topic event notifications (e.g., included in a second subset of partitions) may be processed by one or more new event consumers 114, thus enabling a canary deployment.

In some implementations of a canary deployment, the deployment manager system 112 may determine (e.g., based on user input) a percentage of topic event notifications to be processed by one or more new event consumers 114, as described above in connection with FIG. 1C. Additionally, or alternatively, a feedback system may analyze the system 100 and/or the system 200 to determine the percentage of topic event notifications to be processed by one or more new event consumers 114. For example, the feedback system may receive outcome information from one or more new event consumers 114 indicating an outcome of processing a topic event notification (e.g., indicating successful processing or unsuccessful processing) and/or may obtain outcome information from the topic event store 104 to identify topic event notifications that were successfully or unsuccessfully processed by a new event consumer 114. Based on the outcome information, the feedback system may determine to adjust the percentage of topic event notifications processed by new event consumers 114. For example, if a threshold percentage of topic events are successfully processed by a new event consumer 114, if a threshold number of topic events are successfully processed by a new event consumer 114, and/or if a new event consumer 114 successfully processes topic events for a threshold amount of time, then the feedback system may determine to increase the percentage of topic event notifications processed by new event consumers 114. Alternatively, if a threshold percentage of topic events are not successfully processed by a new event consumer 114, if a threshold number of topic events are not successfully processed by a new event consumer 114, and/or if a new event consumer 114 does not successfully process topic events for a threshold amount of time, then the feedback system may determine to reduce the percentage of topic event notifications processed by new event consumers 114. The feedback system may transmit a message to the deployment manager system 112 to adjust the percentage, and the deployment manager system 112 may adjust the percentage as described above in connection with FIG. 1C. Alternatively, the feedback system may directly adjust the percentage (e.g., by publishing a state event notification to the state event store 110).

In some implementations, the system 200 may use machine learning to determine when to adjust a percentage of topic event notifications processed by new event consumers 114. For example, a machine learning model may be trained using a set of topic event notifications that were processed, and metadata and/or outcome information associated with that processing, starting when an initial new event consumer 114 is deployed until an increase in the percentage of topic event notifications processed by new event consumers 114 (e.g., an increase triggered by user input). The machine learning model may trained using multiple of these sets of topic event notifications and outcome information to identify patterns indicative of when to increase the percentage. After training, the machine learning model may receive topic event notifications, metadata, and/ or outcome information as input, and may use the learned patterns to determine when to trigger an increase in the percentage. The deployment manager system 112 may adjust the percentage based on this trigger (e.g., which may be received from a machine learning system or the feedback system that uses machine learning), or a machine learning system (or the feedback system) may directly adjust the percentage (e.g., by publishing a state event notification to the state event store 110).

In some implementations, rather than directly controlling the percentage of topic event notifications processed by new event consumers 114, the system 100 and/or the system 200 may indirectly control the percentage of topic event notifications processed by new event consumers 114. For example, the system 100 and/or the system 200 may control the percentage of active new event consumers 114 (e.g., out of a total number of active event consumers, including the active old event consumers 106 and the active new event consumers 114), which indirectly controls the percentage of topic event notifications processed by new event consumers 114 (e.g., depending on the percentage of topic event notifications stored in each partition and which event consumers are assigned to each partition).

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
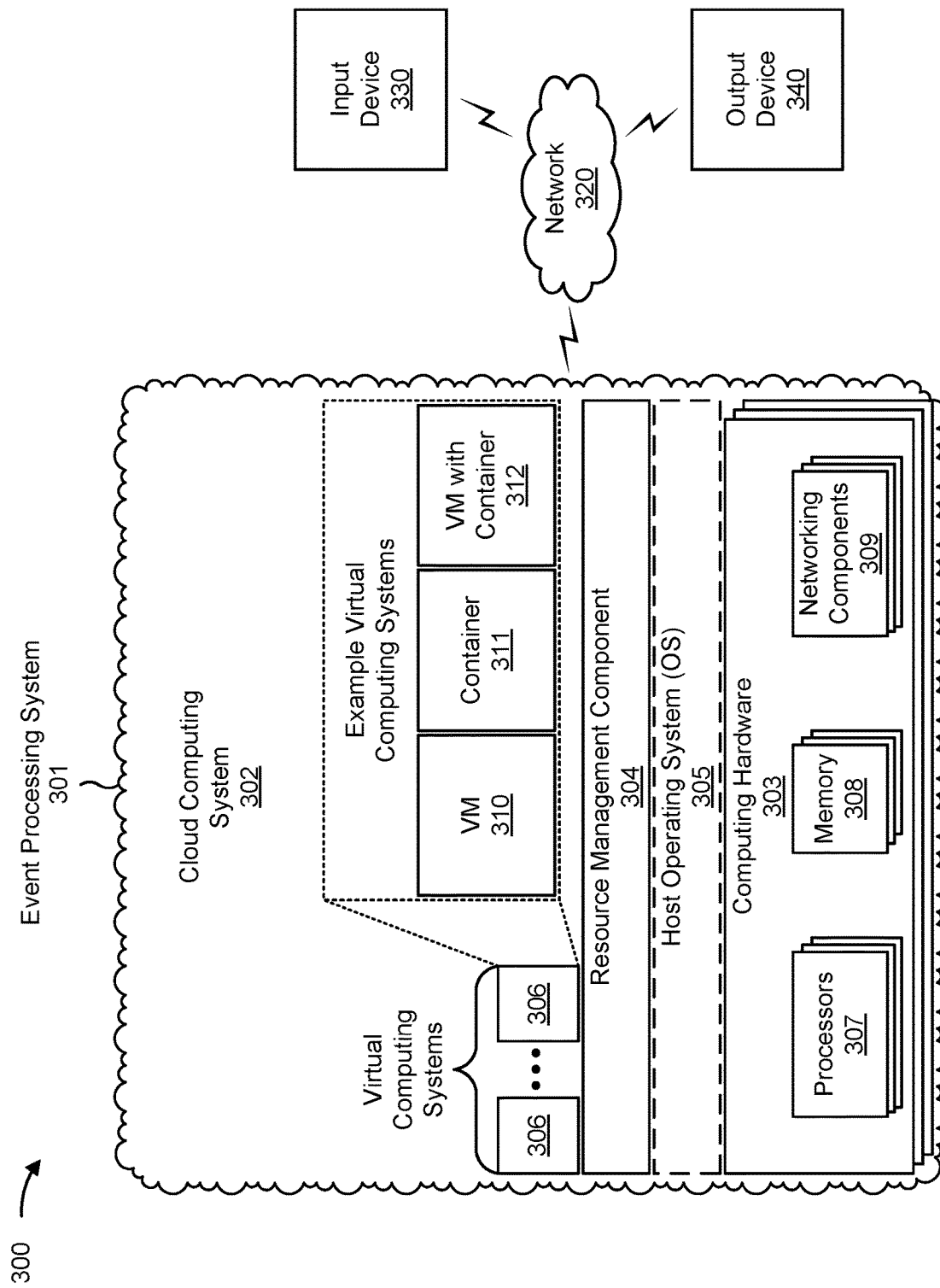
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an event processing system 301, which may include one or more elements of and/or may execute within a cloud computing system 302. The cloud computing system 302 may include one or more elements 303-312, as described in more detail below. As further shown in FIG. 3, environment 300 may include a network 320, an input device 330, and/or an output device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305. In some implementations, an event consumer may be implemented using (e.g., may execute within) a container 311. In some implementations, an event consumer may be implemented using (e.g., may execute within) a virtual machine 310.

A virtual computing system 306 includes a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the event processing system 301 may include one or more elements 303-312 of the cloud computing system 302, may execute within the cloud computing system 302, and/or may be hosted within the cloud computing system 302, in some implementations, the event processing system 301 may not be cloud-based (e.g., may be implemented outside of a cloud computing system) or may be partially cloud-based. For example, the event processing system 301 may include one or more devices that are not part of the cloud computing system 302, such as device 400 of FIG. 4, which may include a standalone server or another type of computing device. The event processing system 301 may perform one or more operations and/or processes described in more detail elsewhere herein.

In some implementations, the system 100 of FIGS. 1A-1D and/or the system 200 of FIG. 2 may be or may include one or more elements of the event processing system 301 of FIG. 3. For example, the old event consumer 106 and/or the new event consumer 114 may include computing hardware 303, a resource management component 304, a host operating system 305, and/or a virtual computing system 306. Additionally, or alternatively, the topic event store 104 and/or the state event store 110 may include memory 308. Additionally, or alternatively, the deployment manager system 112 may include computing hardware 303, a resource management component 304, and/or a host operating system 305.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The input device 330 may include one or more devices that are an event source, an event producer, or a data source for events to be processed by the event processing system 301, the system 100, and/or the system 200 and may transmit event notifications to one or more of these systems. The input device 330 may include a communication device and/or a computing device. For example, the input device 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the input device 330 may be or may include an event producer 102 (or vice versa).

The output device 340 may include one or more devices that are event consumers for events processed by the event processing system 301, the system 100, and/or the system 200. The output device 340 may receive instructions to perform one or more actions based on the processing of events by one or more of these systems (e.g., by one or more event consumers). The output device 340 may perform such actions, such as triggering alerts, triggering workflows, or performing some other automated action or processing. The output device 340 may include a communication device and/or a computing device. For example, the output device 340 may include a server, such as an application server, a client server, a web server, a database server, a host server, a proxy server, a virtual server (e.g., executing on computing hardware), or a server in a cloud computing system. In some implementations, the output device 340 may be or may include a downstream system 108 (or vice versa).

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
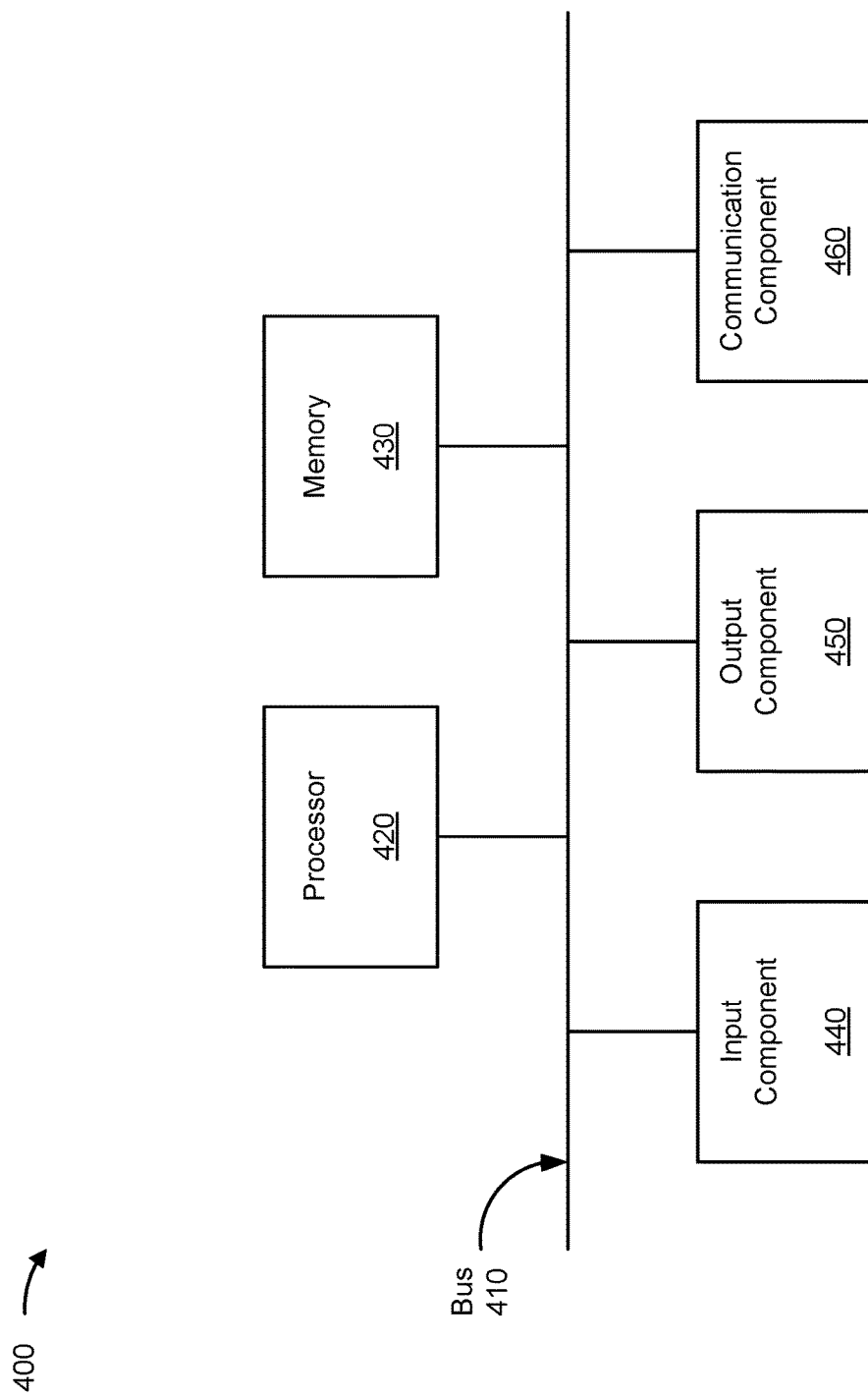
FIG. 4 is a diagram of example components of one or more devices of FIG. 3.

FIG. 4 is a diagram of example components of a device 400, which may correspond to event producer 102, topic event store 104, old event consumer 106, downstream system 108, state event store 110, deployment manager system 112, new event consumer 114, event processing system 301, input device 330, and/or output device 340. In some implementations, event producer 102, topic event store 104, old event consumer 106, downstream system 108, state event store 110, deployment manager system 112, new event consumer 114, event processing system 301, input device 330, and/or output device 340 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
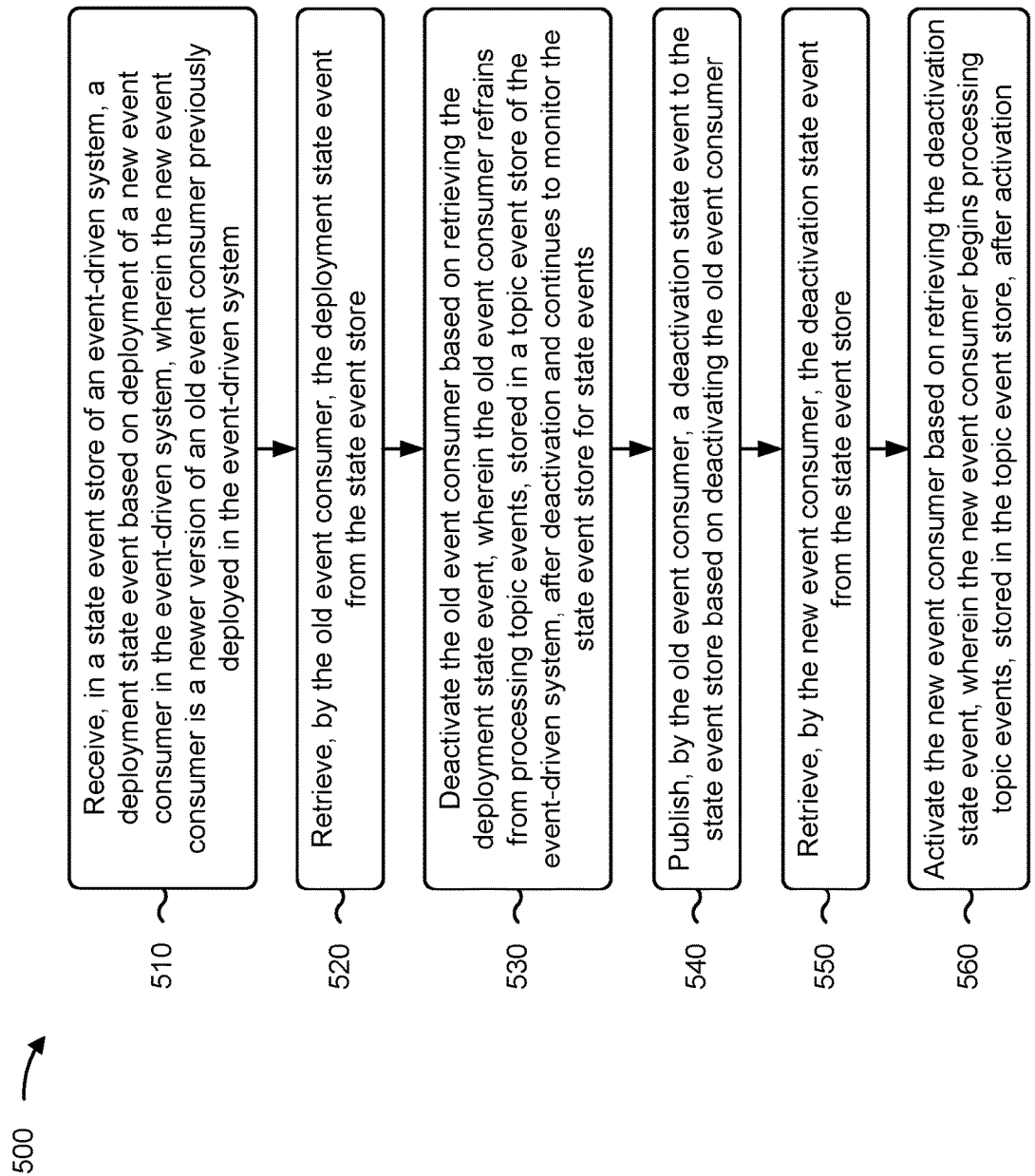
FIG. 5 is a flowchart of an example process relating to deployment of new versions of event consumers in an event-driven system.

FIG. 5 is a flowchart of an example process 500 associated with deployment of new versions of event consumers in an event-driven system. In some implementations, one or more process blocks of FIG. 5 may be performed by a system (e.g., system 100 and/or system 200). In some implementations, one or more process blocks of FIG. 5 may be performed by another device or a group of devices separate from or included in the system 100 and/or the system 200, such as an old event consumer 106, a deployment manager system 112, and/or a new event consumer 114. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving, in a state event store of an event-driven system, a deployment state event notification based on deployment of a new event consumer in the event-driven system, wherein the new event consumer is a newer version of an old event consumer previously deployed in the event-driven system (block 510). As further shown in FIG. 5, process 500 may include retrieving, by the old event consumer, the deployment state event notification from the state event store (block 520). As further shown in FIG. 5, process 500 may include deactivating the old event consumer based on retrieving the deployment state event notification, wherein the old event consumer refrains from processing topic event notifications, stored in a topic event store of the event-driven system, after deactivation and continues to monitor the state event store for state event notifications (block 530). As further shown in FIG. 5, process 500 may include publishing, by the old event consumer, a deactivation state event notification to the state event store based on deactivating the old event consumer (block 540). As further shown in FIG. 5, process 500 may include retrieving, by the new event consumer, the deactivation state event notification from the state event store (block 550). As further shown in FIG. 5, process 500 may include activating the new event consumer based on retrieving the deactivation state event notification, wherein the new event consumer begins processing topic event notifications, stored in the topic event store, after activation (block 560).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An event-driven system for deployment of a new version of an event consumer, comprising:
    a topic event store configured to store multiple topic event notifications;
    a state event store configured to store one or more state event notifications;
    one or more processors configured to:
        identify a deployment state event notification based at least in part on deployment of a first event consumer, wherein the deployment state event notification is stored in the state event store;
        deactivate a second event consumer based at least in part on the deployment state event notification;
        provide a deactivation state event notification to the state event store based on deactivating the second event consumer; and
        activate the first event consumer based on the deactivation state event notification, wherein the first event consumer begins processing topic event notifications stored in the topic event store based on activating the first event consumer.

2. The event-driven system of claim 1, wherein the first event consumer, upon deployment and prior to activation, obtains one or more event notifications from the state event store.

3. The event-driven system of claim 1, wherein the second event consumer is configured to:
    finish processing of a topic event notification when the deployment state event notification is received by the second event consumer;
    deactivate the second event consumer after finishing processing of the topic event notification;
    refrain from processing topic event notifications after finishing processing of the topic event notification; and
    publish the deactivation state event notification to the state event store.

4. The event-driven system of claim 1, wherein the deployment state event notification causes a set of event consumers to be deactivated and refrain from processing topic event notifications, the set of event consumers including the second event consumer.

5. The event-driven system of claim 1, wherein a plurality of topic event notifications comprise a set of partitions in the topic event store, and wherein the second event consumer is configured to process topic event notifications from a first subset of partitions of the set of partitions, and wherein a third event consumer is configured to process topic event notifications from a second subset of partitions of the set of partitions.

6. The event-driven system of claim 5,
    wherein the deployment state event notification causes the second event consumer to be deactivated and refrain from processing first topic event notifications of a plurality of topic event notifications while the third event consumer is active and processing second topic event notifications of the plurality of topic event notifications, and
    wherein the deactivation state event notification causes the first event consumer to begin processing topic event notifications from a partition associated with the second event consumer.

7. The event-driven system of claim 1, wherein the one or more processors are further configured to identify one or more old event consumers, including the second event consumer, to be deactivated based on a percentage of topic event notifications to be processed by the first event consumer.

8. The event-driven system of claim 1, further comprising shutting down the second event consumer based on a condition being satisfied in connection with processing of topic event notifications by the first event consumer.

9. A method for deployment of a new version of an event consumer in an event-driven system, comprising:
identifying, in a state event store of the event-driven system, a deployment state event notification based on deployment of a first event consumer,
wherein the first event consumer is a different version relative to a second event consumer previously deployed in the event-driven system;
deactivating the second event consumer based on a deployment state event notification,
wherein the second event consumer refrains from processing topic event notifications after deactivation and continues to monitor the state event store for state event notifications;
providing a deactivation state event notification to the state event store based on deactivating the second event consumer; and
activating the first event consumer based on the deactivation state event notification,
wherein the first event consumer begins processing topic event notifications after activation, and
wherein the first event consumer, after activation, updates metadata in a topic event store to indicate successful processing.

10. The method of claim 9, further comprising:
updating metadata associated with one or more topic event notifications processed by the second event consumer to indicate that the one or more topic event notifications have been processed; and
identifying a topic event notification that the first event consumer is to begin processing based on the metadata.

11. The method of claim 9, wherein the second event consumer is included in a set of event consumers that process a same type of event notification from the topic event store, and wherein the deployment state event notification causes the set of old event consumers to be deactivated and refrain from processing additional topic event notifications.

12. The method of claim 9, wherein the topic event store is partitioned into a plurality of partitions that each store a different set of topic event notifications,
wherein the second event consumer processes topic event notifications from a subset of partitions of the plurality of partitions, and
wherein one or more other event consumers remain active after the second event consumer is deactivated, and
wherein the deactivation state event notification causes the first event consumer to begin processing topic event notifications from the subset of partitions.

13. The method of claim 9, further comprising:
detecting a failure associated with processing topic event notifications by the first event consumer after activation;
publishing a failure state event notification to the state event store based on detecting the failure;
deactivating the first event consumer based on detecting the failure;
identifying, by the second event consumer, the failure state event notification from the state event store; and activating the second event consumer based on the failure state event notification,
wherein the second event consumer resumes processing topic event notifications, stored in the topic event store, after activation.

14. The method of claim 9, further comprising:
determining that a threshold amount of time has elapsed without a success state event notification being retrieved from the state event store by the second event consumer; and
activating the second event consumer based on the threshold amount of time,
wherein the second event consumer resumes processing topic event notifications after activation.

15. The method of claim 14, further comprising providing, by the second event consumer, an activation state event notification to the state event store based on activating the second event consumer, wherein the activation state event notification causes the first event consumer to be deactivated.

16. An event-driven system for event consumer deployment, comprising:
means for identifying a deployment state event notification stored in a state event store based on deployment of a first event consumer in the event-driven system,
wherein the first event consumer is a newer version of a second event consumer deployed in the event-driven system;
means for deactivating the second event consumer based on the deployment state event notification,
wherein the second event consumer refrains from processing topic event notifications after deactivation, and
wherein the second event consumer continues to monitor the state event store for state event notifications after deactivation;
means for providing a deactivation state event notification to the state event store based on deactivating the second event consumer; and
means for activating the first event consumer based on the deactivation state event notification,
wherein the first event consumer begins processing topic event notifications stored in a topic event store after activation.

17. The event-driven system of claim 16, wherein the deployment state event notification includes:
an application identifier associated with the first event consumer and the second event consumer, and
a version identifier indicating a version of the first event consumer; and
wherein the means for deactivating the second event consumer comprises means for deactivating the second event consumer based on:
the application identifier matching a stored application identifier associated with the second event consumer, and
the version identifier indicating that the first event consumer is a different version relative to the second event consumer.

18. The event-driven system of claim 16, further comprising means for providing the deployment state event notification to the state event store.

19. The event-driven system of claim 16, wherein the second event consumer is one of a plurality of event consumers that process a same type of event notification, and wherein the means for deactivating the second event consumer cause deactivation of the plurality of event consumers.

20. The event-driven system of claim 16, wherein the second event consumer is one of a plurality of event consumers that process a same type of event notification, and
wherein the means for deactivating the second event consumer cause deactivation of a subset of event consumers of the plurality of event consumers.

\* \* \* \* \*